(12) United States Patent
Kerkman et al.

(10) Patent No.: US 6,617,821 B2
(45) Date of Patent: Sep. 9, 2003

(54) METHOD AND APPARATUS FOR COMPENSATING FOR DEVICE DYNAMICS BY ADJUSTING INVERTER CARRIER FREQUENCY

(75) Inventors: Russel J. Kerkman, Milwaukee, WI (US); David W. Schlegel, Saukville, WI (US); David Leggate, New Berlin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 09/956,781

(22) Filed: Sep. 20, 2001

(65) Prior Publication Data

US 2003/0052642 A1 Mar. 20, 2003

(51) Int. Cl.$^7$ ................................................ H02P 7/42
(52) U.S. Cl. ....................................... 318/801; 318/811
(58) Field of Search ................................ 318/448, 611, 318/702, 798–801, 810, 811; 363/39, 40, 41, 95–98, 131, 132

(56) References Cited

U.S. PATENT DOCUMENTS

| | | | | |
|---|---|---|---|---|
| 4,320,531 A | * | 3/1982 | Dimon | 455/203 |
| 5,376,872 A | * | 12/1994 | Hara | 318/799 |
| 6,088,246 A | * | 7/2000 | Okuyama et al. | 363/41 |
| 6,259,611 B1 | * | 7/2001 | Ito et al. | 363/40 |
| 6,310,913 B1 | * | 10/2001 | Ishikawa | 375/238 |
| 6,342,818 B1 | * | 1/2002 | Segawa et al. | 331/14 |

* cited by examiner

Primary Examiner—Bentsu Ro
(74) Attorney, Agent, or Firm—Quarles & Brady, LLC

(57) ABSTRACT

A method and apparatus for reducing parasitic distortion in terminal voltages connected to a PWM inverter, the method comprising the steps of receiving each of a command operating frequency and a command carrier frequency, comparing the command operating frequency to low and high threshold operating frequency values, and where the command operating frequency is less than the low threshold frequency, restricting the carrier frequency to a minimum carrier frequency, where the command operating frequency is greater than the high threshold frequency, setting the carrier frequency equal to the command carrier frequency and, where the operating frequency is between the low and high threshold frequencies, setting the carrier frequency to an intermediate value between the minimum carrier frequency and the commanded carrier frequency.

21 Claims, 6 Drawing Sheets

6,617,821 B2

METHOD AND APPARATUS FOR COMPENSATING FOR DEVICE DYNAMICS BY ADJUSTING INVERTER CARRIER FREQUENCY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to motor controllers and more particularly to a method and an apparatus for compensating for switching device dynamics in inverter systems.

One type of commonly designed motor is a three phase motor having three Y-connected stator windings. In this type of motor, each stator winding is connected to an AC voltage source by a separate supply line, the source providing time varying voltages across the stator windings. Often, an adjustable speed drive (ASD) will be positioned between the voltage source and the motor to control motor speed by controlling the stator voltages and frequency.

Many ASD configurations include a pulse width modulated (PWM) inverter consisting of a plurality of switching devices and a PWM controller. Referring to FIG. 1, an exemplary PWM inverter leg 10 corresponding to one of three motor phases includes two series connected switches 12, 13 between positive and negative DC rails 18, 19 and two diodes 16, 17, a separate diode in inverse parallel relationship with each switch 12, 13. By turning the switches 12, 13 ON and OFF in a repetitive sequence, leg 10 receives DC voltage via rails 18 and 19 and provides high frequency voltage pulses to a motor terminal 22 connected to a stator winding 24. By firing the switching devices in a regulated sequence the PWM inverter can be used to control both the amplitude and frequency of voltage that are eventually provided across windings 24.

Referring to FIG. 2, an exemplary sequence of high frequency voltage pulses 26 that an inverter might provide to a motor terminal can be observed along with an exemplary low frequency alternating fundamental voltage or terminal voltage 28 and related alternating current 30. By varying the widths of the positive portions 32 of each high frequency pulse relative to the widths of the negative portions 34 over a series of high frequency voltage pulses 26, a changing average voltage which alternates sinusoidally can be generated. The changing average voltage defines the terminal voltage 28 that drives the motor. The terminal voltage 28 in turn produces a low frequency alternating current 30 that lags the voltage by a phase angle $\phi$.

The hardware that provides the firing pulses to the PWM inverter is typically referred to as a PWM controller. A typical controller includes, amount other things, a PWM generator. Various controller components receive a command operating frequency and convert the operating frequency into three phase modulating waveforms that are provided to the PWM generator. Referring to FIG. 3(a), illustrative waveforms used by a signal generator to generate the firing pulses for leg 10 may be observed. As well known in the art, a carrier waveform 36 is perfectly periodic and operates at what is known as the carrier frequency. A modulating voltage waveform 38 is typically sinusoidal, having a much greater period than the carrier waveform 36.

Referring also to FIGS. 3(b) and 3(c), an upper signal 40 and a lower signal 42 that control the upper and lower switches 12, 13 respectively can be observed. The turn-on tu1, tu2 and turn-off to 1, to 2 times of the upper and lower signals 40, 42 come from the intersections of the modulating waveform 38 and the carrier waveform 36.

When the modulating waveform 38 intersects the carrier waveform 36 while the carrier waveform has a positive slope, the upper signal 40 goes OFF and lower signal 42 goes ON. On the other hand, when the modulating waveform 38 intersects the carrier waveform 36 while the carrier waveform has a negative slope, the upper signal 40 goes ON and the lower signal 42 goes OFF. Thus, by comparing the carrier waveform 36 to the modulating waveform 38, the state of the upper and lower signals 40, 42 can be determined.

Referring also to FIGS. 2 and 3(d), an ideal high frequency voltage pulse 26 resulting from the ideal upper and lower signals 40, 42 in FIGS. 3(b) and 3(c) that might be provided at terminal 22 can be observed. When the upper signal 40 is ON and the lower signal 42 is OFF, switch 12 allows current to flow from the high voltage rail 18 to motor terminal 22 thus producing the positive phase 44 of pulse 26 at motor terminal 22. Ideally, when the upper signal 40 goes OFF and the lower signal 42 goes ON, switch 12 immediately turns OFF and switch 13 immediately turns ON connecting motor terminal 22 and the low voltage rail 19 producing the negative phase 46 of pulse 26 at terminal 22. Thus, the ideal high frequency voltage pulse 26 is positive when the upper signal 40 is ON and is negative when the lower signal 42 is ON. Also, ideally, the low frequency terminal voltage and corresponding current (see FIG. 2) should be completely sinusoidal and mirror the operating waveforms.

As well known in the motor controls art, when an inverter terminal is linked to an inductive load, the load current cannot reverse directions immediately upon switching of inverter switches and therefore the currents caused by the high frequency voltage pulses are at least partially smoothed by the inductive load. Early technology used to configure inverter switches was relatively rudimentary and therefore, not surprisingly, switching speed was relatively slow. In fact, despite the waveform smoothing load inductance, early inverters often caused appreciable amounts of terminal voltage ripple that, in some applications, was unacceptable. For this reason many early inverter configurations included complex and bulky filter configurations to smooth out the terminal voltages.

Recently much faster switches have been developed and adopted by the controls industry that reduce terminal voltage ripple and therefore, at least in some inverter configurations, substantially minimize the need for complex filter configurations. For instance, high speed IGBTs are capable of turning on or off in as little as several tens of nanoseconds (i.e., 50 nsec).

While fast switching IGBTs are now routinely used to configure inverters, in many cases the higher switching speeds have resulted in other adverse operating characteristics and operating phenomenon. One adverse characteristic is that some motors, due to their construction, resonate and generate ringing noise at frequencies corresponding to specific carrier frequencies. To address this problem several prior references teach that the carrier signal frequency can be reduced as the operating frequency is increased. To this end, see U.S. Pat. No. 4,691,269 and U.S. Pat. No. 5,068,777.

Other adverse operating phenomenon, including reflected waves, bearing currents, conducted interference, turn-on delays and radiated interference, have been effectively dealt with by modifying operating waveforms and in other ways calculated to compensate for associated distortions. These phenomenon that are already compensated for will be referred to generally as "other phenomenon".

Unfortunately, while efforts to reduce the effects of these other phenomenon have reduced terminal voltage distortions, experience has shown that even after these efforts, under certain circumstances, appreciable terminal voltage distortion still occurs. While not well understood, some in the industry have generally recognized that these circumstantial distortions are due to complex capacitive and inductive interaction between inverter devices and other system components (e.g. supply lines, motor windings, filter devices, etc.). The causes of these circumstantial distortions are generally referred to herein as "parasitics" and the distortions as parasitic distortions. FIGS. 4–6 demonstrate the effects of parasitics on drive performance. FIG. 4 shows the phase current for a 10 hp industrial drive with full compensation for the other phenomenon with a load cable of approximately 3 m (10 ft) where the carrier frequency is 2 kHz and the operating frequency is 2 Hz. As can be seen in FIG. 4, under these circumstances, while there is some ripple in the terminal currents, the ripple is relatively minimal.

FIG. 5 shows a current waveform generated using the same configuration as that used to generate the waveform in FIG. 4 where the carrier frequency has been increased from 2 kHz to 8 kHz. Clearly the carrier frequency increase causes appreciable distortion in the resulting terminal current waveform and would likely result in motor cogging.

FIG. 6 shows a current waveform generated using the same configuration as that used to generate the waveform in FIG. 5 with an 8 kHz (i.e., same frequency as in FIG. 5) carrier frequency where the cable length has been increased from 3 meters to 60 meters (i.e., 200 ft). Here the terminal current is further distorted and also includes a positive DC offset.

To compensate for parasitic distortions some industry members have developed complex and relatively hardware intensive feedback loops. Many of these systems require dedicated sensors (e.g., temperature, current, voltage, etc.) and processors to perform relatively computationally intensive algorithms to reduce parasitic distortions. Unfortunately, these systems, as might be expected, are relatively expensive and hence are not an option in the case of relatively inexpensive applications.

Thus, it would be advantageous to have a simple and inexpensive system that is controlled to minimize ripple while still providing a high switching frequency where possible.

BRIEF SUMMARY OF THE INVENTION

It has been recognized that parasitics are caused by the interaction of inverter switches with other system hardware and that, given the inductive and capacitive nature of various system components, the amount of terminal current parasitic distortion is related to operating and carrier signal frequencies. More specifically, it has been recognized that parasitic distortion is generally large and unacceptable during low operating frequency and high carrier frequency control. It has also been recognized that parasitic distortion is generally low and acceptable during low operating and carrier frequency control. To this end see again FIGS. 4 and 5 where an inverter was operated at a low 2 Hz operating frequency and the carrier frequency was 2 kHz and 8 kHz, respectively.

Surprisingly, experiments have shown that as operating frequency is increased to relatively higher values, parasitic distortion due to high carrier frequencies is appreciably reduced. In fact, at higher operating frequencies, carrier frequency can often be set at levels that essentially eliminate ripple distortion without causing appreciable parasitic distortion such that the resulting amount of terminal current distortion is minimized. Moreover, it has been recognized that where the operating frequency is relatively high, even in long cable (e.g., 200 ft) configurations, the carrier frequency can be set relatively high without causing the DC offset shown in FIG. 6 and without causing the parasitic distortion which is also shown in FIG. 6.

Taking advantage of the surprising realizations described above, in order to maintain a high switching frequency where possible while still minimizing terminal current distortion, a carrier selector is provided that alters the carrier frequency as a function of operating frequency. The invention includes a generator that receives each of the operating frequency and command carrier frequency and, when the operating frequency is below a low threshold operating frequency, sets the carrier frequency to a minimum carrier frequency and, when the operating frequency is above the low threshold operating frequency, sets the carrier frequency to a higher value. More specifically, where the operating frequency is above the high threshold frequency the carrier frequency is set at the command carrier frequency and between the high and low threshold frequencies the carrier frequency is set at intermediate carrier frequency levels.

The invention also includes an apparatus for controlling an inductive load, the apparatus comprising a reference voltage generator for receiving an operating frequency and generating modulating waveforms corresponding thereto, a carrier generator for receiving the operating frequency and generating a restricted carrier waveform that is restricted to a minimum carrier frequency when the operating frequency is below a low threshold frequency and is restricted to an other carrier frequency when the operating frequency is above a high threshold frequency where the other carrier frequency is greater than the minimum carrier frequency, a PWM generator for comparing the modulating waveforms and the restricted carrier waveform and generating PWM firing signals there from and an inverter receiving the PWM pulses and generating output voltages at terminals linked to the load.

In one aspect the invention may include a carrier frequency selector useable to set the other carrier frequency wherein the selector provides the other carrier frequency to the carrier generator, the other carrier frequency being a command carrier frequency. In some embodiments, between the low and high threshold frequencies the carrier generator generates a carrier frequency between the minimum and the command carrier frequencies. In other embodiments, between the low and high threshold frequencies the carrier generator causes a linear transgression between the minimum carrier frequency and the command carrier frequency. In yet other embodiments, between the low and high threshold operating frequencies there are N intermediate operating frequencies and wherein, at each of the N intermediate operating frequencies the carrier generator generates a separate intermediate carrier frequency where each of the intermediate carrier frequencies is between the minimum and command carrier frequencies.

In some embodiments the minimum carrier frequency is approximately 2 kHz, the low threshold frequency is approximately 2 Hz and the high threshold frequency is approximately 8 Hz.

The invention also includes an apparatus for reducing inverter terminal voltage distortion in a system that receives an operating frequency signal, converts the operating frequency signal to modulating waveforms and compares a carrier waveform to the modulating waveforms to generate inverter firing pulses, the system also including a carrier frequency selector for selecting a command carrier frequency. Here the apparatus comprises a carrier generator receiving the operating frequency signal and the command carrier frequency and generating a restricted carrier waveform that is restricted to a minimum carrier frequency when the operating frequency is below a low threshold operating frequency and is restricted to the command carrier frequency when the operating frequency is above a high threshold operating frequency where the command carrier frequency is greater than the minimum carrier frequency.

The invention further includes a method for reducing inverter terminal voltage distortion in a system that receives an operating frequency signal, converts the operating frequency signal to modulating waveforms and compares a carrier waveform to the modulating waveforms to generate inverter firing pulses, the system also including a carrier frequency selector for selecting a command carrier frequency, the method comprising the steps of receiving an operating frequency signal and a command carrier frequency and generating a restricted carrier waveform that is restricted to a minimum carrier frequency when the operating frequency is below a low threshold operating frequency and is restricted to the command carrier frequency when the operating frequency is above a high threshold operating frequency, wherein the command carrier frequency is greater than the minimum carrier frequency.

Between the low and high threshold operating frequencies, the method may include generating a carrier frequency between the minimum and the command carrier frequencies. In the alternative, between the low and high threshold operating frequencies, the method may include causing a linear transgression between the minimum carrier frequency and the command carrier frequency. According to yet another alternative, between the low and high threshold operating frequencies there may be N other intermediate frequencies and wherein, at each of the N intermediate frequencies the method includes the step of generating a separate intermediate carrier frequency where each of the intermediate carrier frequencies is between the minimum and command carrier frequencies.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

In the description that follows, an "F" will be used to denote a frequency signal, a "V" will denote a voltage signal, a "*" superscript will be used to denote a command signal, an "lt" subscript will be used to denote a low threshold signal, an "ht" subscript will be used to denote a high threshold signal, a "" will be used to denote an intermediate signal, an "e" subscript will be used to denote an operating signal and a "c" subscript will be used to denote a carrier signal.

Figure 1:
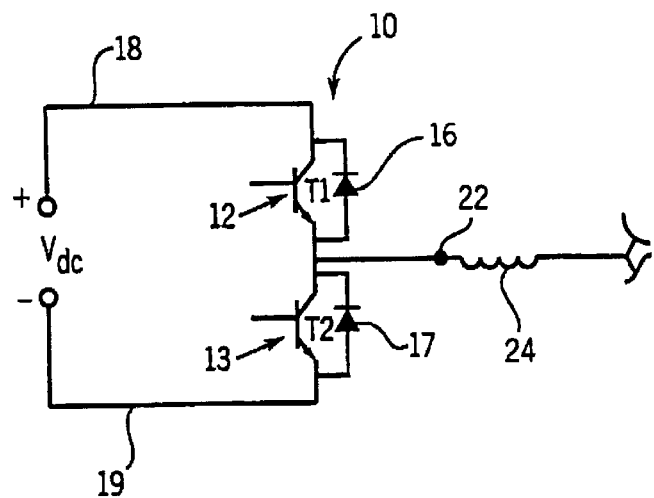
FIG. 1 is a schematic view of a single leg of a PWM inverter.
Figure 2:
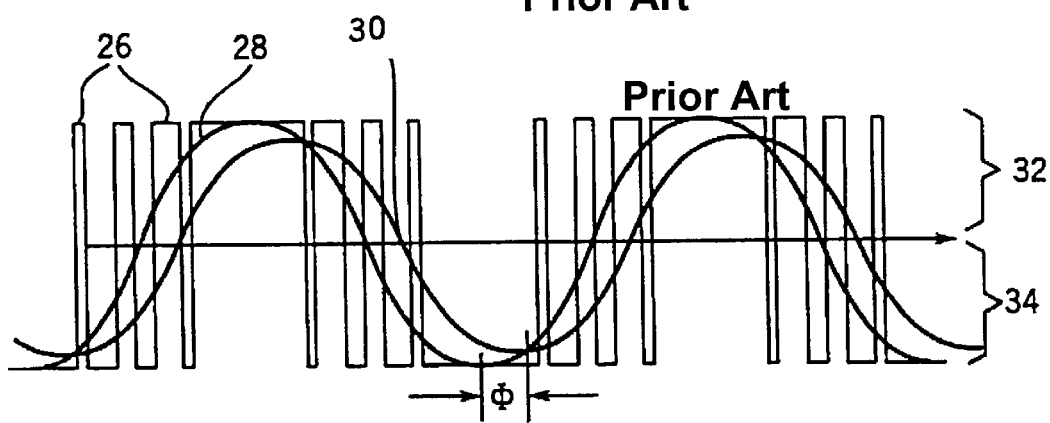
FIG. 2 is a graph illustrating high frequency PWM pulses and resulting low frequency alternating voltage and current that may result from operation of the leg illustrated in FIG. 1.
Figure 3A:
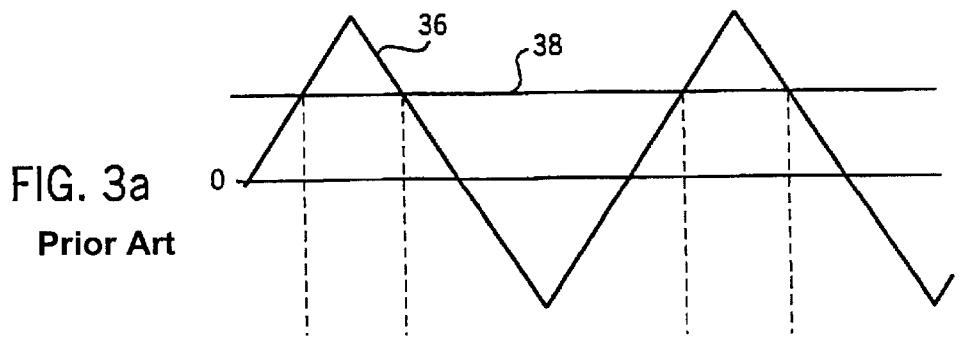
FIG. 3a is a graph illustrating a high frequency carrier signal and a low frequency modulating waveform.
Figure 3B:
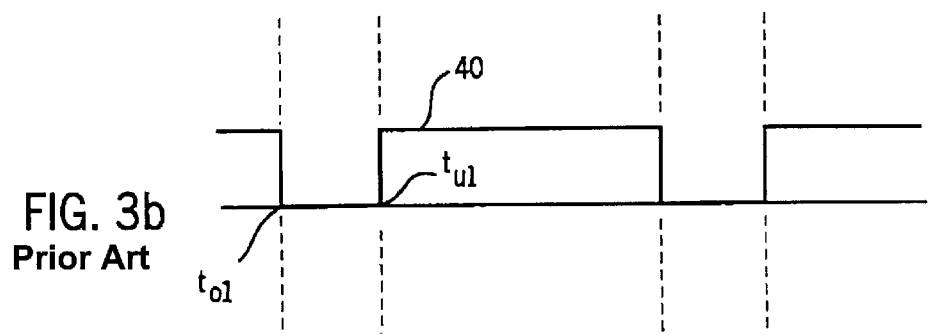
FIG. 3b illustrates firing pulses provided to one of the switches of FIG. 1.
Figure 3C:
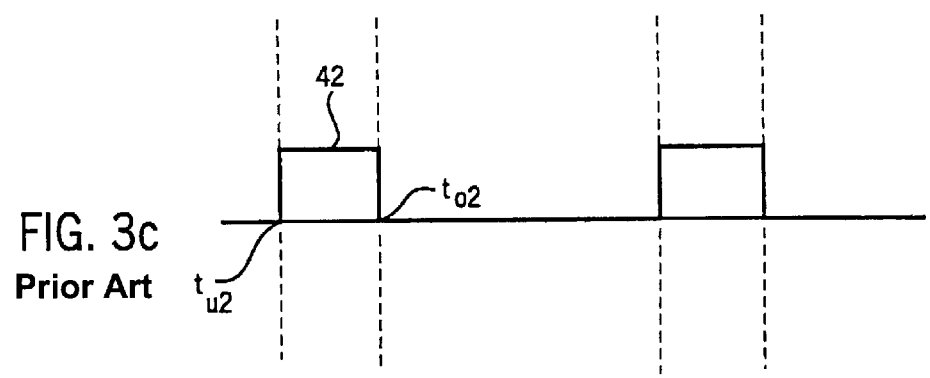
FIG. 3c is similar to FIG. 3b, albeit illustrating firing pulses for the other of the switches in FIG. 1.
Figure 3D:
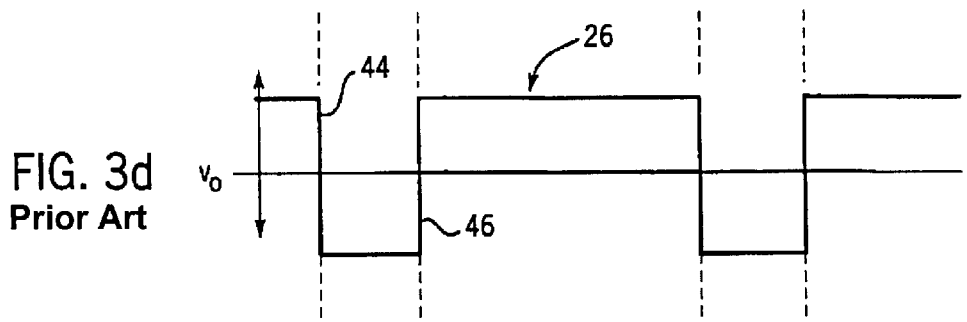
FIG. 3d illustrates high frequency voltage pulses that result from the firing pulses of FIGS. 3b and 3c.
Figure 4:
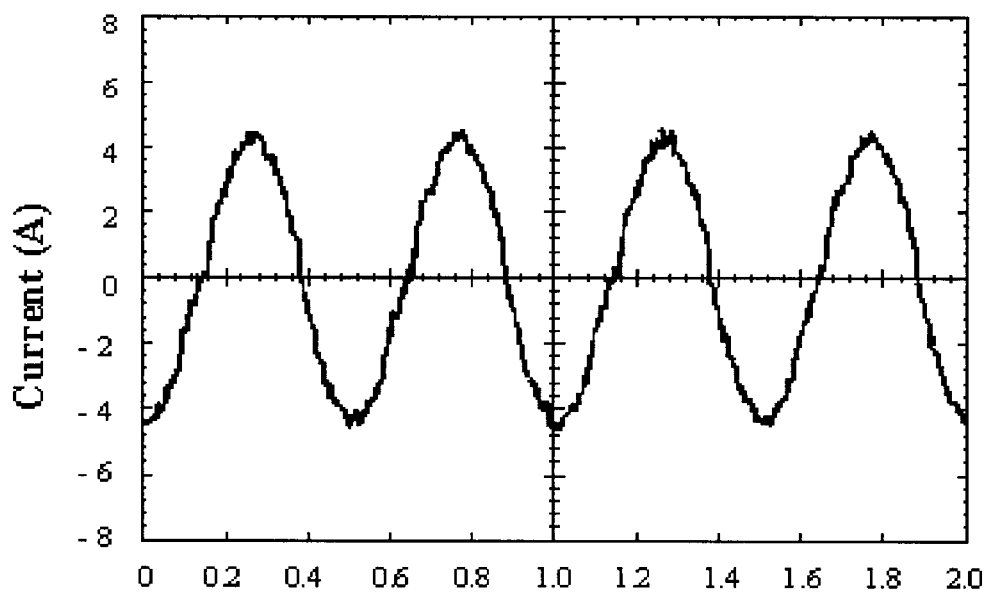
FIG. 4 is a graph illustrating terminal current versus time wherein an operating frequency was 2 Hz and the carrier frequency was 2 kHz.
Figure 5:
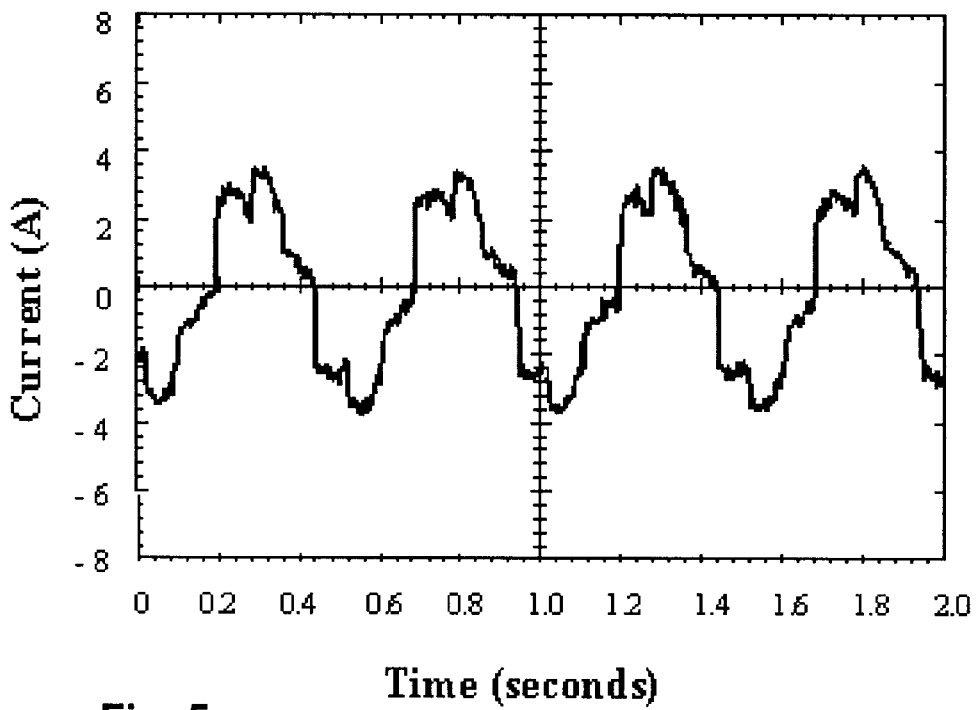
FIG. 5 is similar to FIG. 4, albeit where the carrier frequency was increased to 8 kHz.
Figure 6:
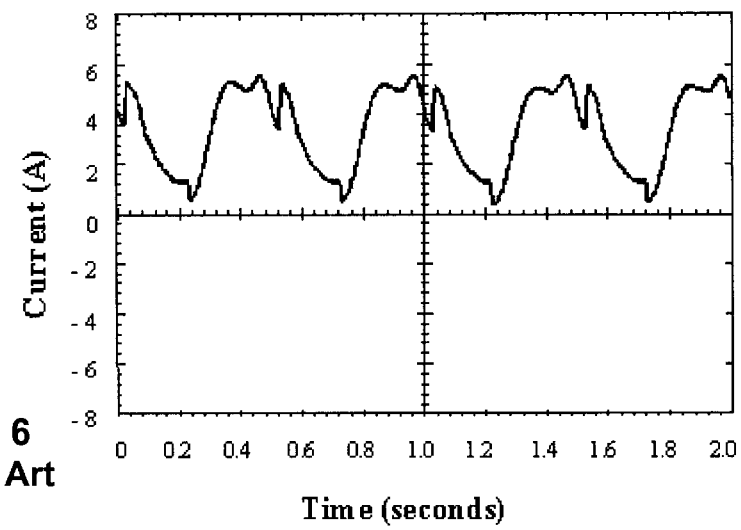
FIG. 6 is similar to FIG. 5 except that FIG. 6 was generated with a system including cables that were appreciably longer than the cables used in the system that generated the waveform in FIG. 5.

Referring now to the drawings wherein like reference characters correspond to similar components throughout the several views and more specifically, referring to FIG. 7, the present invention will be described in the context of an exemplary inverter controller 100 that receives a command operating frequency signal $F_e^*$ and generates inverter firing pulses on six separate control lines (collectively identified by numeral 120). Referring also to FIG. 1, the pulses from one pair of lines 120 are provided to switching devices T1 and T2 to turn each of those devices ON and OFF in a repetitive sequence thereby linking positive and negative DC rails 18 and 19, respectively, to terminal 22 to generate voltage pulses thereat. The voltage pulses at terminal 22 cause a terminal current which flows through motor winding 24. Although not illustrated, the pulses from the other lines 120 are also provided to switching devices in two other inverter legs to cause terminal currents in two other motor phases. By controlling the pulses on lines 120 the terminal currents and hence motor operation are controllable.

Figure 7:
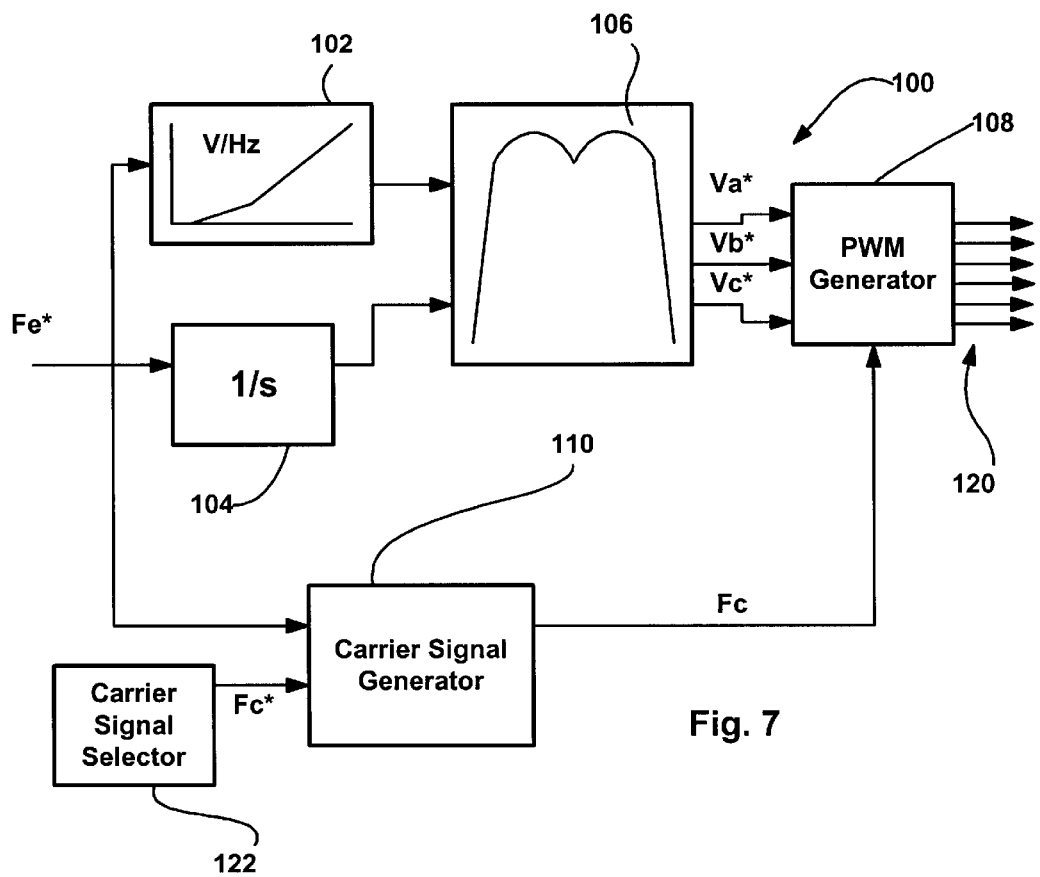
FIG. 7 is a schematic diagram showing one embodiment of the inventive PWM controller.

Referring still to Fig. 7, controller 100 includes a Voltage/Hertz converter 102, an integrator 104, a voltage waveform generator 106, a PWM generator 108, a carrier generator i 10 and a carrier selector 122. Converter 102 receives frequency $F_e^*$ and converts frequency $F_e^*$ into a voltage value that is provided to generator 106. Integrator 104 also receives frequency $F_e^*$ and, as its name implies, integrates frequency $F_e^*$ to generate an integrated signal provided to generator 106.

Upon receiving signals from converter 102 and integrator 104, generator 106 generates three voltage command or modulating signals $V_a^*$, $V_b^*$ and $V_c^*$ that are typically similar but phase shifted by 120° from each other and are often generally sinusoidal. Although not illustrated, prior to being provided to generator 108, signals $V_a^*$, $V_b^*$ and $V_c^*$ may be altered to compensate for various other phenomenon described above include turn on delays, reflected waves, bearing currents, radiated interference, etc., so that the signals actually received by generator 108, while fundamentally sinusoidal, in fact would include compensating off sets.

Referring still to FIG. 7, command operating frequency $F_e^*$ is also provided to generator 110. Carrier selector 122 includes an interface (e.g., knob, etc.) that allows a system user to manually select a maximum or command carrier frequency $F_c^*$. The command carrier frequency $F_c^*$ is provided to generator 110.

Carrier generator 110 receives the command carrier frequency $F_c^*$ and the command operating frequency $F_e^*$ and, based thereon, generates a carrier frequency output signal $F_c$ that is provided to PWM generator 108 for comparison to each of modulating waveforms $V_a^*$, $V_b^*$ and $V_c^*$. To this end, referring also to FIG. 8, in one embodiment, generator 110 includes an absolute value determiner 130, a look-up table 132, a comparator 134 and a single pole double throw switch 136. Command operating frequency $F_e^*$ is provided to determiner 130 which generates the absolute value $|F_e^*|$ of command signal $F_e^*$. Look-up table 132 comprises a two column table (not illustrated) that correlates operating frequency $F_e^*$ and carrier frequencies $F_c^*$ and generates an intermediate carrier frequency $F_c'$ at a first input 140 to switch 136. Command carrier signal $F_c^*$ is provided at a second input 142 to switch 136.

Comparator 134 receives the absolute value of the command operating frequency $|F_e^*|$ from determiner 130 and compares value $|F_e^*|$ to a high threshold operating frequency $F_{eht}$. Comparator 134 is linked to and controls switch 136 such that, when value $|F_e^*|$ is less than high threshold value $F_{eht}$, a switch output line 150 is linked to first input 140 and passes a signal from table 132 and, when value $|F_e^*|$ is greater than high threshold value $F_{eht}$, output line 150 is linked to second input 142 and command carrier signal $F_c^*$ is passed as carrier signal $F_c$ for use by PWM generator 108 (see also FIG. 7).

The look-up table 132 may take many specific forms but in general, specifies a relatively low intermediate carrier frequency $F_c'$ when the operating frequency $F_e^*$ is relatively low and specifies higher carrier frequencies as the operating frequency is increased. Specific examples of carrier-to-operating frequency are useful and are provided in graphical form in FIGS. 9, 10 and 11.

Figure 8:
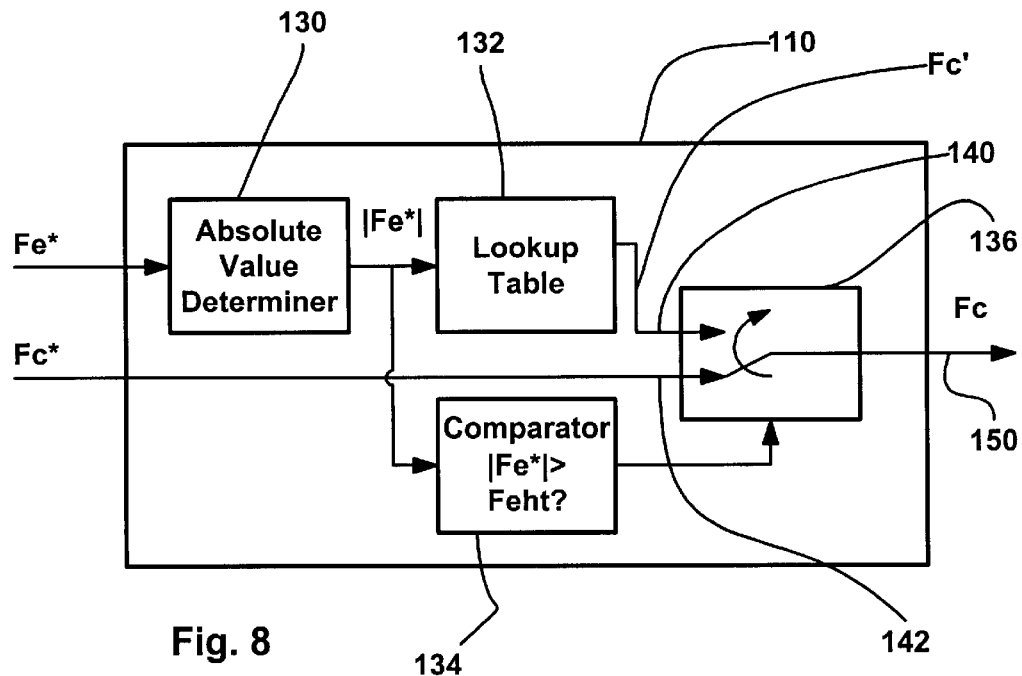
FIG. 8 is a schematic diagram of the carrier signal generator of FIG. 7.
Figure 9:
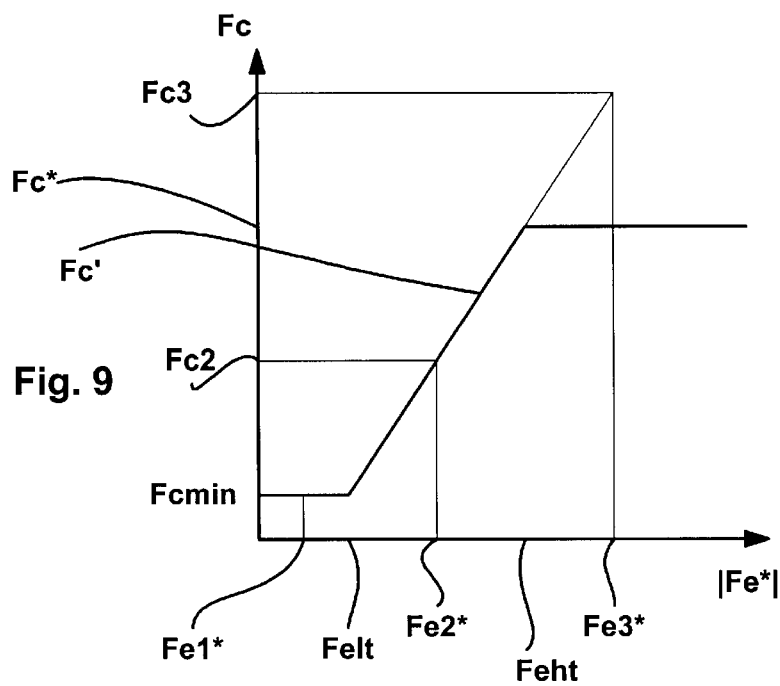
FIG. 9 is a graph illustrating one set of relationships that may be represented by values in look-up table 132 of FIG. 8.
Figure 10:
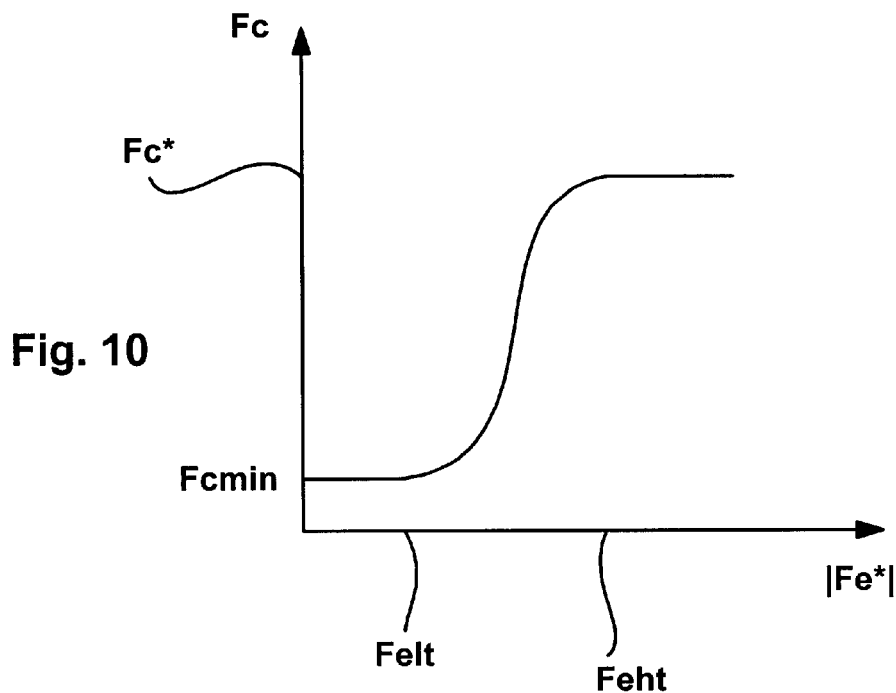
FIG. 10 is similar to FIG. 9, albeit illustrating a second relationship.
Figure 11:
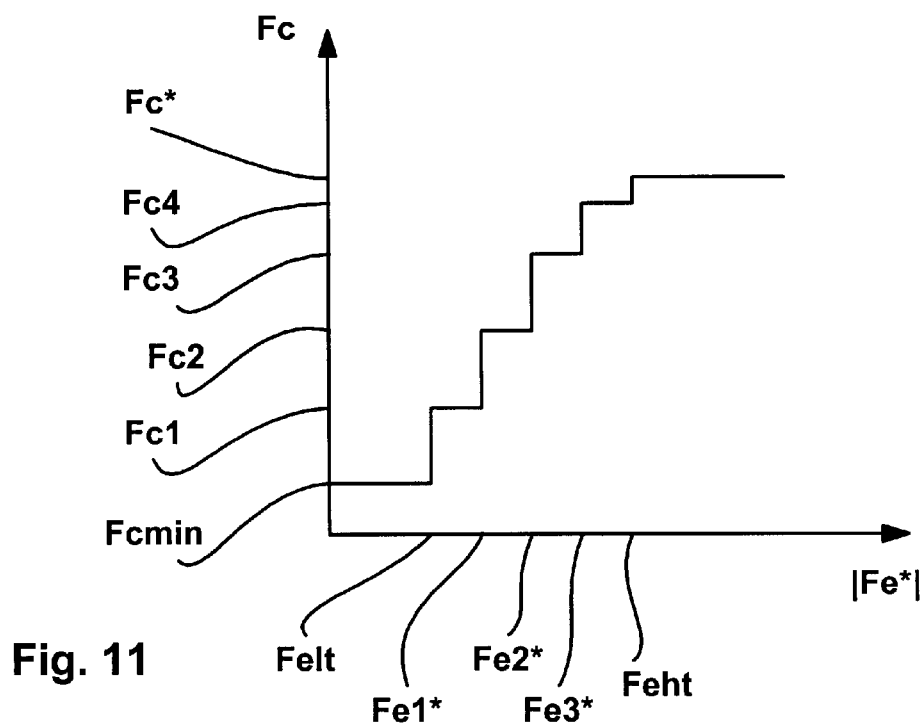
FIG. 11 is similar to FIG. 10, albeit illustrating a third relationship.

Referring to FIGS. 8 and 9, in one embodiment when the operating frequency $|F_e^*|$ is below a low threshold operating frequency $F_{elt}$, the carrier frequency $F_c'$ is set to a minimum carrier frequency $F_{cmin}$. When the operating frequency $|F_e^*|$ is greater than the low threshold frequency $F_{elt}$, the carrier frequency $F_c$ is set to a value above minimum frequency $F_{cmin}$. In one embodiment, generator 110 generates carrier frequencies $F_c'$ starting at minimum frequency $F_{cmin}$ and linearly increasing therefrom as illustrated in FIG. 10.

In operating, assume frequency $F_{cmin}$ is 2 kHz, that $F_{elt}$ is 2 Hz and that $F_{eht}$ is 8 Hz. Also, referring to FIG. 9, assume command operating frequency $F_e^*$ is 1.5 Hz (see $F_{e1}^*$) and that the command carrier frequency $F_c^*$ is 9 kHz. Referring to FIG. 8, after determiner 130 generates absolute value $|F_e^*|$, table 132 generates a carrier frequency signal $F_c'$ corresponding to value $|F_e^*|$ at input 140. In the present example, because command operating frequency $F_{e1}^*$ is less than low threshold operating frequency $F_{elt}$ (i.e., less than 2 Hz), table 132 generates the minimum carrier frequency $F_{cmin}$ as signal $F_c'$.

Referring still to FIG. 8, because command operating frequency $F_{e1}^*$ is less than the high threshold operating frequency $F_{eht}$ (i.e., less than 8 Hz), comparator 134 causes switch 136 to link first input 140 to output 150 thereby providing signal $F_c'$ (i.e., 2 kHz) on line 150.

Next, assuming the conditions above, if the command operating frequency $F_e^*$ where changed from 1.5 Hz to 4 Hz (see $F_{e2}^*$ in FIG. 9) because command operating frequency $F_{e2}^*$ is still less than the high threshold operating frequency $F_{eht}$, comparator 134 still links output line 150 to switch input 140. However, referring again to FIG. 9, because command operating frequency $F_{e2}^*$ falls between the low and high threshold frequencies $F_{elt}$ and $F_{eht}$, respectively, carrier frequency $F_c'$ generated by table 132 is between minimum carrier frequency $F_{cmin}$ (i.e., 2 kHz) and command carrier frequency $F_c^*$. For instance, given the frequencies specified above and assuming a linear relationship between command operating frequency $F_e^*$ and intermediate carrier frequency $F_c'$, signal $F_c'$ may be 4 kHz (see $F_{c2}$ in FIG. 9) when command frequency $F_{e2}^*$ is 4 Hz.

Referring still to FIGS. 8 and 9, assuming the conditions above, if the command operating frequency $F_e^*$ is increased to 10 Hz (see $F_{e3}^*$) (i.e., a value higher than high threshold operating frequency $F_{eht}$), table 130 generates a carrier signal $F_{c3}$ as signal $F_c'$ that is greater than the command carrier frequency $F_c^*$. Thus, for instance, because command carrier frequency $F_c^*$ is 9 kHz, carrier frequency $F_{c3}$ may be approximately 11 kHz (assuming a linear transgression). However, because the command operating frequency $F_{e3}^*$ would now exceed the high threshold operating frequency $F_{eht}$, comparator 134 causes switch 136 to link second input 142 to output line 150. Thus, command carrier signal $F_c^*$, not intermediate carrier signal $F_c'$, is provided at output 150 and, instead of transgressing up the slope in FIG. 9, the maximum carrier frequency $F_c$ is set to the command frequency $F_c^*$.

Referring to FIG. 10, instead of being programmed to cause a linear transgression between the minimum carrier frequency $F_{cmin}$ and the command frequency $F_c^*$, table 130 may be programmed to cause an "S" shaped transgression. In the alternative, referring to FIG. 12, the transgression may take a stepped form where N intermediate carrier frequencies are generated at operating frequencies within specific ranges. For instance, in FIG. 12, when operating frequency $F_e^*$ is below low threshold $F_{elt}$, the carrier frequency $F_c'$ is set equal to minimum frequency $F_{cmin}$, when operating frequency $F_e^*$ is between $F_{elt}$ and $F_{e1}$, carrier frequency $F_c'$ is set equal to frequency $F_{c1}$, when operating frequency $F_e^*$ is between $F_{e1}$ and $F_{e2}$, carrier frequency $F_c'$ is set equal to frequency $F_{c2}$ and so on.

The minimum frequency $F_{cmin}$ and high and low threshold operating frequencies $F_{eht}$, $F_{elt}$, respectively, may be set during a commissioning procedure by monitoring terminal currents as the respective frequencies are modified. In the alternative, the frequency limits may be set prior to release into the field to ensure frequencies within specific ranges.

Thus, it should be appreciated that an extremely simple and inexpensive controller has been described that does not require any feedback loops or sensors and that relies on a simple look-up table that may be implemented in software to modify PWM operation such that terminal distortion is appreciably minimized.

It should be understood that the methods and apparatuses described above are only exemplary and do not limit the scope of the invention, and that various modifications could be made by those skilled in the art that would fall under the scope of the invention. For example, while shown as being configured using separate hardware components, it should be appreciated that various hardware components and/or software could be used to implement the general concepts of the present invention. For instance, a processor running a pulse sequencing program could be provided to carry out the inventive method(s).

To apprise the public of the scope of this invention, the following claims are made:

What is claimed is:

1. An apparatus for controlling an inductive load, the apparatus comprising:
    a reference voltage generator for receiving an operating frequency and generating modulating waveforms corresponding thereto;
    a carrier generator for receiving the operating frequency and generating a restricted carrier waveform that is restricted to a minimum carrier frequency when the operating frequency is below a low threshold frequency and is restricted to an other carrier frequency when the operating frequency is above a high threshold frequency where the other carrier frequency is greater than the minimum carrier frequency;
    a PWM generator for comparing the modulating waveforms and the restricted carrier waveform and generating PWM firing signals therefrom; and
    an inverter receiving the PWM firing signals and generating output voltages at terminals linked to the load.

2. The apparatus of claim 1 further including a carrier frequency selector useable to set the other carrier frequency wherein the selector provides the other carrier frequency to the carrier generator, the other carrier frequency being a command carrier frequency.

3. The apparatus of claim 2 wherein, between the low and high threshold frequencies the carrier generator generates a carrier frequency between the minimum and the command carrier frequencies.

4. The apparatus of claim 3 wherein, between the low and high threshold frequencies the carrier generator causes a linear transgression between the minimum carrier frequency and the command carrier frequency.

5. The apparatus of claim 2 wherein, between the low and high threshold frequencies there are N intermediate operating frequencies and wherein, at each of the N intermediate operating frequencies the carrier generator generates a separate intermediate carrier frequency where each of the intermediate carrier frequencies is between the minimum and command carrier frequencies.

6. The apparatus of claim 1 wherein the minimum carrier frequency is approximately 2 kHz, the low threshold frequency is approximately 2 Hz and the high threshold frequency is approximately 8 Hz.

7. An apparatus for reducing inverter terminal voltage distortion in a system that receives an operating frequency signal, converts the operating frequency signal to modulating waveforms and compares a carrier waveform to the modulating waveforms to generate inverter firing pulses, the system also including a carrier frequency selector for selecting a command carrier frequency, the apparatus comprising:
    a carrier generator receiving the operating frequency signal and the command carrier frequency and generating a restricted carrier waveform that is restricted to a minimum carrier frequency when the operating frequency is below a low threshold operating frequency and is restricted to the command carrier frequency when the operating frequency is above a high threshold operating frequency where the command carrier frequency is greater than the minimum carrier frequency.

8. The apparatus of claim 7 wherein, between the low and high threshold operating frequencies the carrier generator generates a carrier frequency between the minimum and the command carrier frequencies.

9. The apparatus of claim 7 wherein, between the low and high threshold operating frequencies the carrier generator causes a linear transgression between the minimum carrier frequency and the command carrier frequency.

10. The apparatus of claim 7 wherein, between the low and high threshold operating frequencies there are N other intermediate frequencies and wherein, at each of the N intermediate frequencies the carrier generator generates a separate intermediate carrier frequency where each of the intermediate carrier frequencies is between the minimum and command carrier frequencies.

11. The apparatus of claim 7 wherein the minimum carrier frequency is approximately 2 kHz, the low operating frequency is approximately 2 Hz and the high operating frequency is approximately 8 Hz.

12. A method for reducing inverter terminal voltage distortion in a system that receives an operating frequency signal, converts the operating frequency signal to modulating waveforms and compares a carrier waveform to the modulating waveforms to generate inverter firing pulses, the system also including a carrier frequency selector for selecting a command carrier frequency, the method comprising the steps of:
    receiving an operating frequency signal and a command carrier frequency; and
    generating a restricted carrier waveform that is restricted to a minimum carrier frequency when the operating frequency is below a low threshold operating frequency and is restricted to the command carrier frequency when the operating frequency is above a high threshold operating frequency;
    wherein the command carrier frequency is greater than the minimum carrier frequency.

13. The method of claim 12 further including the step of, between the low and high threshold operating frequencies, generating a carrier frequency between the minimum and the command carrier frequencies.

14. The method of claim 13 further including the step of, between the low and high threshold operating frequencies, causing a linear transgression between the minimum carrier frequency and the command carrier frequency.

15. The method of claim 13 wherein, between the low and high threshold operating frequencies there are N other intermediate frequencies and wherein, at each of the N intermediate frequencies the method includes the step of generating a separate intermediate carrier frequency where each of the intermediate carrier frequencies is between the minimum and command carrier frequencies.

16. The method of claim 12 wherein the minimum carrier frequency is between 500 Hz and 2.5 kHz.

17. The method of claim 12 wherein the low threshold operating frequency is approximately 2 Hz and the high threshold operating frequency is approximately 8 Hz.

18. An apparatus for generating PWM inverter firing signals, the apparatus comprising:
    means for receiving a command operating frequency and generating modulating waveforms corresponding thereto;

means for receiving the command operating frequency and generating a restricted carrier waveform that is restricted to a minimum carrier frequency when the operating frequency is below a low threshold frequency and is restricted to a maximum carrier frequency when the operating frequency is above a high threshold frequency where the maximum carrier frequency is greater than the minimum carrier frequency; and means for comparing the modulating waveforms and the restricted carrier waveform and generating PWM firing signals there from.

19. The apparatus of claim 18 further including a means for setting the maximum carrier frequency wherein the means for setting provides the other carrier frequency to the means for receiving.

20. The apparatus of claim 19 wherein the means for generating includes a means for, between the low and high threshold frequencies, generating a carrier frequency between the minimum and the maximum carrier frequencies.

21. The apparatus of claim 20 wherein the means for generating includes a means for, between the low and high threshold frequencies, generating a carrier frequency that linearly transgresses between the minimum carrier frequency and the command operating frequency.

* * * * *